United States Patent [19]

Kotheimer

[11] 3,794,860

[45] Feb. 26, 1974

[54] LONG-TIME DELAY CIRCUIT EMPLOYING HIGH-IMPEDANCE LEVEL DETECTOR

[75] Inventor: William C. Kotheimer, Lansdowne, Pa.

[73] Assignee: General Electric Company, Philadelphia, Pa.

[22] Filed: Sept. 28, 1972

[21] Appl. No.: 293,149

[52] U.S. Cl. .................. 307/272, 307/246, 307/248, 307/273, 307/301

[51] Int. Cl. ............................................ H03k 3/26

[58] Field of Search ... 307/246, 248, 251, 272, 273, 307/283, 301, 271

[56] References Cited

UNITED STATES PATENTS

| | | | |
|---|---|---|---|
| 2,968,770 | 1/1961 | Sylvan | 307/260 |
| 3,271,700 | 9/1966 | Gutzwiller | 307/271 X |
| 3,333,155 | 7/1967 | Steen | 307/301 X |
| 3,334,243 | 8/1967 | Cooper | 307/301 X |
| 3,551,704 | 12/1970 | Baum | 307/301 |
| 3,603,821 | 9/1971 | Flachsbarth | 307/301 X |
| 3,634,758 | 1/1972 | Flagg | 307/301 X |

*Primary Examiner*—Andrew J. James
*Attorney, Agent, or Firm*—Albert S. Richardson, Jr.; J. Wesley Haubner

[57] ABSTRACT

In a protective relay timing circuit including a timing capacitor which is charged by a signal supplied to an input terminal, there is provided a junction-field effect transistor connected in a source-follower arrangement and coupled to the timing capacitor such that the voltage on the source electrode of the transistor is indicative of the voltage appearing on the timing capacitor. Circuitry is also provided to monitor the voltage on the source electrode and to render the gate-to-source junction of the transistor conductive in response to the voltage on the source electrode attaining a preselected level, whereupon the capacitor discharges through said junction.

7 Claims, 6 Drawing Figures

LONG-TIME DELAY CIRCUIT EMPLOYING HIGH-IMPEDANCE LEVEL DETECTOR

BACKGROUND AND OBJECTS OF THE INVENTION

This invention relates generally to solid-state timing circuits, and it relates more particularly to such circuits having relatively long time delays for use in relays for protecting electric power delivery systems.

The following art, now known to applicant, is indicative of some prior art approaches relevant in this area of technology: U.S. Pat. Nos. 3,047,745 (Frank); 3,243,601 (Higgenbotham); 3,566,307 (Morris); 3,643,111 (Deyo); and 3,659,115 (Montgomery).

Solid state timing circuits for protective relays commonly include an energy storage element such as a capacitor which is coupled to an input terminal and is charged by a d-c signal provided at the input terminal. The time constant of the charging circuit is determined by the capacitance value (C) of the capacitor and the resistance value (R) of a timing resistor which is connected in series with the capacitor between it and the input terminal. A unijunction transistor is commonly used for monitoring the voltage appearing on the timing capacitor and for causing operation of the relay when that voltage attains a preestablished level. To that end, the unijunction transistor's emitter-to-base one junction is commonly connected across the timing capacitor.

Where a long time delay is desired, the time constant (RC) of the timing circuit should be relatively large. Since capacitors having a high C are undesirably large and expensive, for a given time delay the resistance value R of the timing resistor should be as high as possible. But the higher the resistance of this resistor, the lower the current flowing into the emitter electrode of the unijunction transistor. As is known, this can cause a unijunction transistor to "stall" (not conduct immediately or not conduct at all). Accordingly, timing circuits utilizing unijunction transistors are limited in the length of time delay attainable without experiencing transistor "stalling" or without incorporating special techniques such as taught by Frank, supra.

It is a primary object of my invention to provide an improved solid-state timing circuit capable of very long, reliable time delays.

A further object of my invention is the provision, for introducing relatively long time delays in the operation of a protective relay, of a relatively simple and inexpensive solid-state timing circuit.

It is yet a further object of my invention to provide an improved solid-state timing circuit including a low capacitance value timing capacitor which can be charged to a voltage magnitude and maintained substantially at that magnitude for a relatively long period of time.

SUMMARY OF THE INVENTION

In carrying out my invention in one form I provide in a protective relay, a solid-state timing circuit capable of very long time delays. The timing circuit comprises a capacitor coupled, via a resistor, to an input terminal at which an input signal is applied. The gate electrode of a junction-field effect transistor, arranged as a source-follower, is coupled to the capacitor, whereby the voltage appearing on the source electrode is indicative of the voltage appearing on the capacitor. Means are coupled to the source electrode of the transistor for rendering the gate-to-source junction thereof conductive when the voltage on the source electrode attains a preselected level, whereupon the capacitor discharges through said junction.

BRIEF DESCRIPTION OF THE DRAWINGS

My invention will be better understood and its various objects and advantages will be more fully appreciated from the following description taken in conjunction with the accompanying drawing in which.

DETAILED DESCRIPTION OF THE PREFERRED EMBODIMENTS

Figure 1:
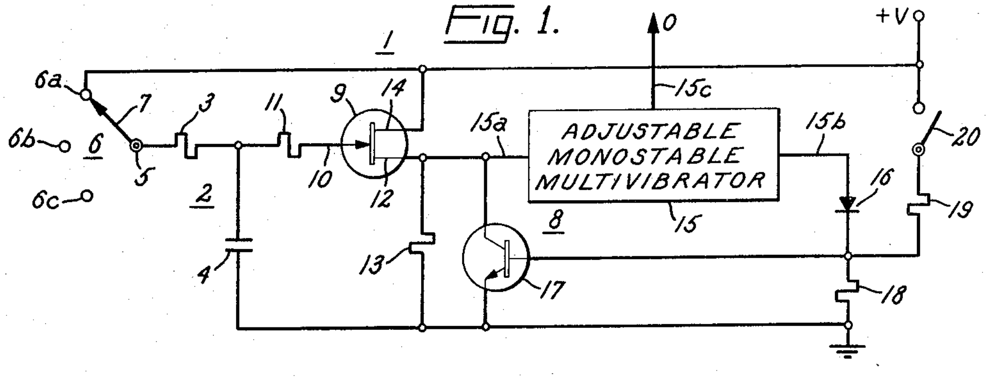
FIG. 1 is a schematic diagram of a solid-state timing circuit in accordance with my invention.

Referring in detail to FIG. 1, there is shown a solid-state timing circuit 1 which is useful, for example, to delay the operation of a protective relay connected in an electric power system (neither the relay nor the power system is shown in the drawing). The timing circuit includes an R-C subcircuit 2 composed of a resistor 3, hereinafter called a timing resistor, and a capacitor 4, hereinafter called a timing capacitor. The subcircuit is arranged to integrate a d-c signal which is applied to its input terminal 5. To that end the timing capacitor 4 is connected between one side of the timing resistor 3 and a reference voltage terminal which is preferably at ground potential, and the other side of the timing resistor is connected to the input terminal 5. The voltage which appears on the timing capacitor 4, designated $V_C$ in FIG. 3*a*, is equal to $(i-\epsilon^{-t/R_3C_4})V_{IN}$ (where $R_3$ is the resistance value of the timing resistor 3, $C_4$ is the capacitance value of the timing capacitor 4, $V_{IN}$ is the magnitude of the voltage on the input terminal 5 with respect to the reference terminal, and $t$ is time measured from the moment $V_{IN}$ is first applied).

Means, to be described later, are provided to monitor the magnitude of the voltage appearing on the timing capacitor and to produce an output signal when the magnitude of $V_C$ attains a preestablished value. The output signal may be used to actuate the associated protective relay.

Two types of input signals are alternatively provided at terminal 5. One type of signal is referred to as a "condition indicating" signal, and its magnitude is a function of a variable power system condition (e.g., the magnitude of line current in a power delivery system). The other type of signal is referred to as a "timing" signal and has a known constant magnitude. When a "condition indicating" signal is provided at the input terminal 5 of the timing circuit 1, the protective relay will operate with a time delay that varies inversely with the magnitude of that signal. When a "timing" signal is provided at the input terminal 5 of the timing circuit 1, relay operation is delayed for a predetermined fixed period of time, the length of which depends on the magnitude of the "timing" signal.

"Timing" signals are supplied to the input terminal 5 of the timing circuit via a contact terminal 6*a* of a single-pole, triple-throw switch 6. Contact terminal 6*a* is connected to a source of voltage +V having a predetermined mangitude. "Condition indicating" signals are supplied to the timing circuit via contact terminal *6b* of the switch 6, which terminal is coupled to relay circuitry (not shown) monitoring electrical conditions in the protected power system. Switch 6 includes a movable contactor 7 to couple signals from either terminal *6a* or *6b* to the input terminal 5 of the timing circuit 1.

Switch 6 also includes a contact *6c* which is electrically isolated. Should contactor 7 be moved out of contact with both terminals *6a* and *6b* and into contact with terminal *6c*, the energy theretofore stored in the timing capacitor will be maintained therein with very little leakage therefrom.

As can be seen in FIG. 1, means 8 are provided to monitor the voltage appearing on the timing capacitor 4 and, when the voltage attains a predetermined level, to produce an output signal O and to discharge the timing capacitor to prepare it for the next timing operation. In accordance with my invention, such means includes a junction-field effect transistor (JFET) 9. A JFET is a well-known semiconductor device having a source, drain, and gate electrodes. A type 2N4221 is suitable. In operation, the gate-source bias controls conductivity of the channel between the drain and the source.

JFET 9 is connected in a source follower arrangement in the timing circuit 1. As shown, its gate electrode 10 is coupled via a current limiting resistor 11 to the common junction of timing capacitor 4 and timing resistor 3. The source electrode 12 of JFET 9 is coupled via a load resistor 13 to the reference terminal (ground). The drain electrode 14 of the JFET 9 is connected to the source of voltage +V.

When connected in this manner, the voltage appearing on the source electrode 12 of the JFET 9 follows the voltage appearing on the gate electrode 10 according to a known relationship determined by the JFET characteristics. The voltage on the source electrode 12 with respect to ground is therefore a measure of the voltage across the timing capacitor 4. Actually this source voltage will be slightly positive with respect to the gate electrode due to drain current flowing through load resistor 13. Since the source electrode 12 is isolated from the capacitor 4 by the gate-to-source junction of the JFET 9 and this junction is normally reverse biased, a very high impedance (typically hundreds of meg-ohms) is present between these points. Therefore, during the charging of capacitor 4 virtually no current will drain through the JFET's gate-to-source junction until an appreciable forward bias is applied to that junction.

The voltage appearing on the source electrode of the JFET 9 is monitored, and when its magnitude attains a preestablished value the gate-to-source junction of the JFET is forward biased, thereby rendering this junction conductive and enabling the timing capacitor to rapidly discharge therethrough. To that end I provide a level detector which preferably comprises an adjustable monostable multivibrator 15. Multivibrator 15 has an input terminal 15a and a pair of output terminals 15b and 15c. The multivibrator is operative to produce output signals at both terminals 15b and 15c when the magnitude of the voltage appearing on input terminal 15a reaches a predetermined level. The output signal at 15b (designated S in FIG. *3b*) is used to effectuate forward bias of the gate-to-source junction of JFET 9. The multivibrator 15 includes means for adjusting the duration of its output signal S, for reasons to be described later.

The output signal S from terminal 15b is coupled via a diode 16 to a controllable electric switch, which, as shown in FIG. 1, preferably comprises a transistor 17. As can be seen therein the collector of transistor 17 is connected to the source electrode 12 of JFET 9, and the emitter of transistor 17 is connected to ground. The base of transistor 17 is connected to the cathode of the diode 16. A base-biasing resistor 18 is connected between the base of transistor 17 and ground.

The transistor 17, when turned on in response to operation of the multivibrator 15, short circuits the load resistor 13 and clamps the source electrode of JFET 9 to ground potential. This action results in forward biasing the gate-to-source junction of the JFET with the full voltage of the timing capacitor 4, whereupon that junction is rendered conductive and energy stored in the timing capacitor discharges through the path including current limiting resistor 11, the gate-to-source junction of JFET 9, and the conducting transistor 17. The time constant of this discharge path is approximately equal to $R_{11}C_4$ (where $R_{11}$ is the ohmic value of resistor 11 and $C_4$ is the capacitance value of capacitor 4). The ohmic value of resistor 11 is much smaller than that of the timing resistor 3, and consequently the time constant governing the discharging of timing capacitor 4 is much shorter than the time constant governing the charging thereof. Once the capacitor is discharged, currend supplied from the source to which the input terminal 15 is connected will keep the gate-to-source junction of the JFET 9 forward biased until the transistor 17 is subsequently turned off.

The duration of the output signal S from the adjustable multivibrator determines the period of time that transistor 17 remains conductive, which in turn determines the degree to which the timing capacitor is discharged and the delay, if any, before it can be recycled (i.e., be recharged anew).

Figure 3:
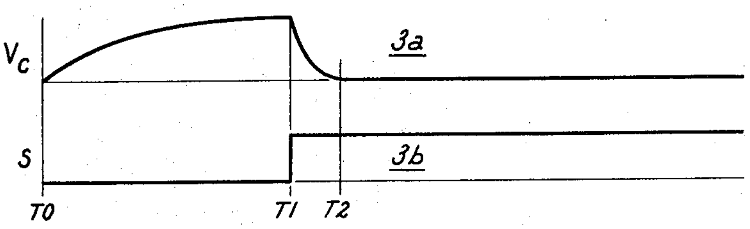
FIGS. 3–6 are graphical representations of the operation of my invention under several conditions.

For example, if the output signal S of the multivibrator 15 is a continuous positive signal, in response to receipt of that signal at its base electrode, transistor 17 is turned on and remains conductive. As soon as transistor 17 begins conducting the gate-to-source junction of JFET 9 becomes conductive whereupon the timing capacitor 4 discharges therethrough to ground. Owing to the short circuit between the source electrode of the JFET 9 and ground via the conducting transistor 17, the timing capacitor will be effectively clamped at ground potential (it will have a trivial charge corresponding to the slight voltage drop across the current limiting resistor 11) and will so remain as long as transistor 17 conducts. This condition is shown in FIG. 3 wherein graph *3a* represents the voltage $V_C$ on timing capacitor 4 and graph *3b* represents the output signal S. At time $T_O$ the contact *6a* is closed and the input signal +V commences at the timing circuit input terminal 5. Time $T_1$ marks a later point in time when the voltage on the timing capacitor 4 has risen to the threshold level that causes multivibrator 15 to produce signal S. As can be seen, the capacitor 4 charges between time $T_0$ and $T_1$, and at $T_1$ it begins to discharge. At a time denoted as $T_2$ the capacitor is effectively completely discharged and so remains as long as signal S persists.

Figure 4:
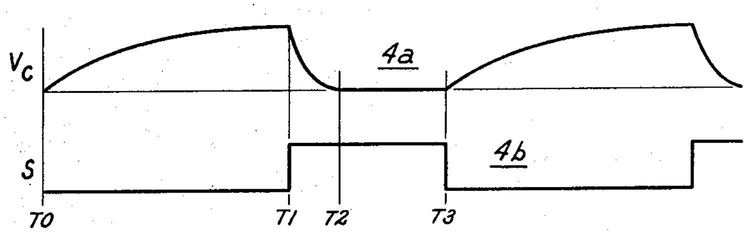

It the duration of positive output signal S is longer than the discharge time constant but is not continuous, timing capacitor 4, after being discharged, will be inhibited from recharging for a fixed time delay corresponding to the duration of that signal. This condition is shown in FIG. 4 wherein graph 4*a* represents voltage $V_C$ and graph 4*b* represents output S. As in the graphs 3*a* and 3*b*, $T_0$ marks the commencement of charging of capacitor 4, $T_1$ represents the commencement of signal S, and $T_2$ represents the point in time that the capacitor has effectively discharged completely. At a time denoted $T_3$, signal S terminates and the timing circuit is now reset. As can be seen the duration of signal S (i.e., $T_1$ to $T_3$) is longer than the discharge time of capacitor 4. Accordingly, there will be a delay of at least this duration before capacitor 4 begins recharging, (i.e., capacitor 4 begins charging again at time $T_3$, assuming the input signal is then present).

Figure 5:
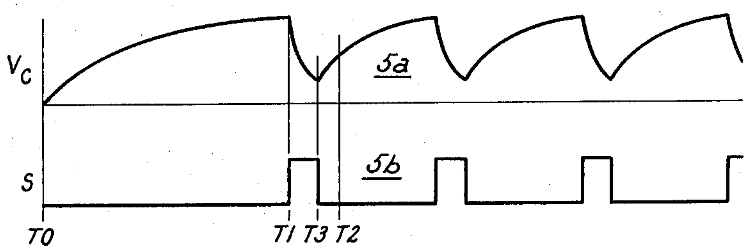

If the duration of positive output signal S is shorter than the discharge time of capacitor 4, capacitor 4 will not be completely discharged before it begins recharging anew. This condition is shown in FIG. 5 where graph 5*a* represents the voltage $V_C$ on capacitor 4 and graph 5*b* represents output signal S. It will be seen that the signal S terminates (at $T_3$) before the capacitor has time to discharge completely (at $T_2$). Since the duration of signal S is shorter than the discharge time, capacitor 4 will not have discharged completely at the time that transistor 17 turns off, whereupon capacitor 4 will begin to recharge from the residual level it had been discharged to. When the voltage on capacitor 4 again attains the predetermined level (which occurs in a shorter period of time than the initial charge time T0 to T1), multivibrator 15 provides another signal S and the abovedescribed operation repeats.

If the duration of signal S is equal to the discharge time of capacitor 4 (i.e., if T2 coincides with T3), immediately after capacitor 4 has discharged completely it begins recharging anew. Such a condition is shown in the graphs 6*a* and 6*b* of FIG. 6.

Figure 6:
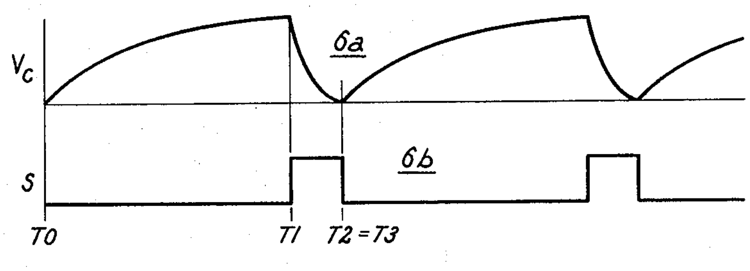

As should be appreciated from the above examples, my timing circuit is readily adaptable to various relay timing functions. For example, if a "lock out" function is desired once the voltage on the timing capacitor has attained a preestablished level, the multivibrator 15 may be adjusted to provide a continuous output signal S, as shown in FIG. 3. If, instead of a total lockout, it is desirable only temporarily to prevent recycling, e.g., to allow system components to cool off after operation of the protective apparatus, the multivibrator 15 may be adjusted to produce a discrete output signal S whose duration is longer than the discharge time of the timing capacitor, as shown in FIG. 4. If it is desirable to permit retiming immediately after the discharge of the timing capacitor, the multivibrator may be adjusted to provide a positive output signal S whose duration is equal to the discharge time of capacitor 4, as shown in FIG. 6. If it is desirable to reset the circuit before the capacitor has been discharged completely so that the second and subsequent time delays are shorter than the first, multivibrator 15 may be adjusted to provide a positive output signal S whose duration is less than the discharge time of the capacitor, as shown in FIG. 5.

Irrespective of the duration of positive output signal S, each time that multivibrator 15 operates it also produces an output signal O at terminal 15*c*. This signal may be utilized for controlling the operation of associated protective apparatus (e.g., output O may initiate a tripping operation of a circuit breaker in the protected electric power line).

As can be seen in FIG. 1, auxiliary means for activating the reset transistor 17 and for preventing the timing capacitor from recharging is included in my timing circuit. The auxiliary means includes a current limiting resistor 19 connected via a normally open single-pole, single-throw switch 20, between the positive voltage +V and the base electrode of transistor 17. The switch 20 is closed in response to a suitable command from external means (not shown), whereupon the transistor 17 is turned on even though the multivibrator 15 has not produced a positive output signal S. Accordingly, capacitor 4 will be discharged through the gate-to-source junction of the JFET 9 to ground prior to operation of the multivibrator 15, and its recharging will then be blocked until the switch 20 is subsequently opened.

Figure 2:
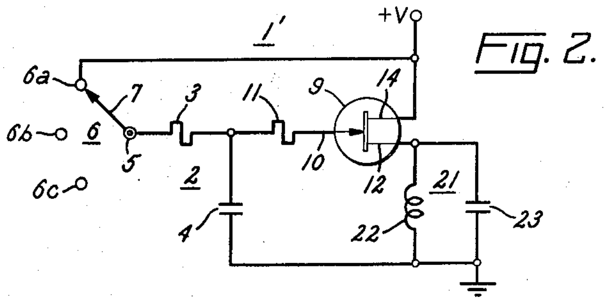
FIG. 2 is a schematic diagram of another solid-state timing circuit in accordance with my invention.

In FIG. 2 there is shown another timing circuit 1' in accordance with my invention. That timing circuit is constructed in a similar manner to the timing of circuit 1 shown in FIG. 1 and similar components are denoted with the same reference numerals as in timing circuit 1.

As can be seen in FIG. 2 a relay means 21 is provided in lieu of the multivibrator 15 and transistor 17 to monitor the voltage appearing on the source electrode 12 of the JFET 9 and to render the gate-to-source junction thereof conductive. To that end relay means 21 includes a pair of normally open contacts 23 actuated by a relay coil 22 which, in parallel with the contacts, is connected between the source electrode of the JFET 9 and the reference terminal (ground).

Operation of the timing circuit 1' is as follows: When an input signal is provided at input terminal 5 (e.g., in the case shown in FIG. 2 the input signal is +V), current flows through the timing resistor 3 to charge capacitor 4. During the charging of capacitor C4 virtually no current flows through the resistor 11 and the gate-to-source junction of the JFET 9, yet due to the source follower configuration of the JFET the voltage appearing on its source electrode closely approximates the voltage on its gate electrode (i.e., the capacitor 4 voltage $V_C$). When this voltage attains a predetermined level, coil 22 of the relay 21 is sufficiently energized to operate (i.e., pick up), whereupon the associated normally open contacts 23 close. This action short circuits the impedance of coil 22 and effectively pulls the source electrode of the JFET to ground potential, whereupon the gate-to-source junction thereof is forward biased by $V_C$ and becomes conductive and capacitor 4 begins discharging therethrough. Other relay contacts (not shown) are actuated at the same time to signal operation of the relay 21. If the contacts 23 of the relay 21 are latching contacts (i.e., contacts which once closed remain closed) the capacitor 4 will discharge completely and be precluded from recharging anew until these contacts are subsequently released. If the contacts 23 are not latching, the collapse of the JFET source electrode voltage will deenergize the relay coil 22 whereupon the relay drops out (which action can be delayed if desired). As soom as the contacts 23 reopen, the capacitor 4 can begin recharging anew. The length of the delay between the closing and reopening of non-latching contacts determines if the timing capacitor 4 will discharge completely before recharging and if so, whether there will be a minimum delay before it begins recharging.

In the FIG. 2 embodiment of my invention, a time delay of approximately one minute can be reliable obtained by using the following components and parameters:

| Component | Model or Value |
|---|---|
| JFET **9** | HEP801 |
| Resistor **3** | 100 megohms |
| Resistor **11** | 100 ohms |
| Capacitor **4** | 1 microfarad |
| +V | 20 volts |
| Pickup rating of **21** | 12 volts |

As should be appreciated, my invention had several advantages over priot art resistor-capacitor, unijunction transistor timing circuits. During its operation, as the capacitor voltage increases and approaches the threshold of level detector response, negligible current is drained from the capacitor. This characteristic prevents stalling and permits the charge on the timing capacitor to remain relatively constant for a long period of time if the input signal is interrupted or removed. Furthermore, it is achieved with a timing resistor 3 whose ohmic value may be quite high, whereby unusually long time delays can be realized with relatively small and inexpensive timing capacitors. In practice, I have successfully obtained delays of approximately 1½ hours using a one microfarad timing capacitor and a one megohm timing resistor which were provided with intermittent, short input signal pulses of 15-volt magnitude and 75-microsecond duration, these input pulses cyclically recurring at a constant interval of 0.55 second until the pickup level of the voltage monitor (10.5 volts) was reached. Since the reset transistor 17 is not connected directly across the timing capacitor, it too may be a relatively inexpensive component having high leakage and still not result in the drainage of appreciable current from the capacitor 4 during the period that the gate-to-source junction of the JFET 9 is nonconducting. The extremely high input impedance of the JFET will preclude such drainage. As was previously described, a variety of reset cycles is available, and this versatility is advantageous for universal timers.

While I have shown and described particular embodiments of my invention, it will be obvious to those skilled in the art that other changes and modifications may be made without departing from my invention in its broader aspects, and I intend herein to cover all such changes and modifications as fall within the true spirit and scope of my invention.

What I claim and desire to secure by Letters Patent of the United States is:

1. In a timing circuit including electric energy storage means coupled to an input terminal at which a d-c input signal is provided, the improvement comprising:

a. a junction-field effect transistor including a gate electrode coupled to said energy storage means and a source electrode isolated from said energy storing means by the gate-to-source junction of said transistor, said transistor being connected in a source-follower configuration whereby the voltage appearing on the source electrode of said transistor is indicative of the voltage appearing on said storage means; and b. means for monitoring the magnitude of the voltage appearing on said source electrode and for rendering gate-to-source junction of said transistor conductive in response to the voltage on said source electrode attaining a predetermined value, whereupon said energy storage means begins discharging through said junction.

2. The subject matter as specified in claim 1 wherein said monitoring means comprises:

i. level detecting means operative to produce an output signal when said source electrode voltage attains said predetermined value, and ii. controllable means responsive to operation of said level detecting means for forward biasing the gate-to-source junction of said transistor.

3. The subject matter of claim 2 wherein the timing circuit includes a reference voltage terminal, said energy storage means is connected between said input and reference terminals, said source-follower configuration includes impedance means connected between said source electrode and said reference terminal, and said controllable means comprises means for short-circuiting said impedance means and thereby rendering said junction conductive in response to operation of said level detecting means.

4. The sbuject matter as specified in claim 3 wherein said controllable means is a transistor which is turned on by said output signal.

5. The subject matter as specified in claim 1 wherein said monitoring means comprises relay means including a coil shunted by a pair of normally open separable contacts, said relay means being connected between said source electrode and a reference voltage terminal, said coil closing said contacts when the magnitude of the voltage on said source electrode attains a predetermined value.

6. The subject matter as specified in claim 1 wherein said energy storage means is a capacitor.

7. The subject matter as specified in claim 2 wherein said controllable means is also arranged to forward bias said junction prior to operation of said level detecting means in response to a predetermined command.

* * * * *